United States Patent [19]

Edmundson

[11] Patent Number: 5,125,060
[45] Date of Patent: Jun. 23, 1992

[54] FIBER OPTIC CABLE HAVING SPLICELESS FIBER BRANCH AND METHOD OF MAKING

[75] Inventor: Gary W. Edmundson, Hickory, N.C.

[73] Assignee: Alcatel NA Cable Systems, Inc., Claremont, N.C.

[21] Appl. No.: 680,991

[22] Filed: Apr. 5, 1991

[51] Int. Cl.[5] ............................ G02B 1/10; G02B 6/26
[52] U.S. Cl. ........................................ 385/100; 385/135
[58] Field of Search ................................ 385/100–104

[56] References Cited

U.S. PATENT DOCUMENTS

| | | | |
|---|---|---|---|
| 4,779,951 | 10/1988 | Bouvard et al. | 385/135 |
| 4,795,230 | 1/1989 | Garcia et al. | 385/135 X |
| 4,799,757 | 1/1989 | Goetter | 385/135 |
| 4,909,591 | 3/1990 | Capol | 385/100 |
| 5,037,177 | 8/1991 | Brown et al. | 385/100 X |
| 5,050,945 | 9/1991 | Sorensen | 385/135 X |

*Primary Examiner*—Akm E. Ullah
*Attorney, Agent, or Firm*—Ware, Fressola, Van Der Sluys & Adolphson

[57] ABSTRACT

A spliceless optical fiber cable has a main distribution cable having a plurality of optical fibers disposed therein and at least one stub or drop cable extending from the distribution cable at one or more branch points. The stub or drop cables are configured with the distribution cable in a manner such that no splices are required. At each branch point, an optical fiber branch module is utilized for protecting the optical fibers from moisture and mechanical damage, providing a strong anchoring point for the stub or drop cable, and insuring that the minimum bend radius is not violated. The spliceless optical fiber cable is made by accessing the specified optical fibers at a disconnect point along the length of the distribution cable and cutting the specified optical fibers. At the branch point, the specified optical fibers are again accessed and carefully pulled from within the buffer tube and protective elements of the distribution cable so that a length of the specified optical fibers is disposed outside of the distribution cable.

43 Claims, 1 Drawing Sheet

FIBER OPTIC CABLE HAVING SPLICELESS FIBER BRANCH AND METHOD OF MAKING

BACKGROUND OF THE INVENTION

1. Field of the Invention

The present invention relates generally to the field of optical fiber cables and more particularly to a spliceless optical fiber cable having at least one stub or drop cable extending therefrom.

2. Description of the Prior Art

With the advent of local area networks and the relative broadband capabilities of fiber optic links, it has become commonplace for new communication systems to include fiber optic capabilities. In the use of optical fibers, optical fiber cables are provided for physical protection of the fibers in view of the fragile nature of the glass optical fibers. A main distribution cable, which is normally deployed underground, is typically used between two distant termination points in a communication system. At a point where a connection must be made to local homes or buildings, a splice is made to one or more optical fibers in the distribution cable for connecting a separate smaller-sized cable for connection with the local termination point. The smallersized cable may be either a drop cable, which is directly routed from the distribution cable to the local home or building or a stub cable, which is routed from the distribution cable to an above-ground pedestal or an optical network unit (ONU) for subsequent connection to a plurality of local termination points by drop cables.

In those localities where a plurality of local termination points are to be connected into the system, it is more desirable to utilize a stub cable rather than having a plurality of drop cables spliced to various branch points along the distribution cable. A stub cable is an optical fiber cable, normally shorter in length than a drop cable, having typically two or more optical fibers therein. The stub cable is spliced at a branch point to the distribution cable. It is then routed to a pedestal, an ONU, or other optical equipment for subsequent connection to the local termination points via drop cables. A pedestal is used as an above-ground location for making splices to the various drop cables which are utilized in the immediate locality. The use of the pedestal to house the splices and to provide access to the distribution cable avoids the necessity and inconvenience of digging up the distribution cable if, for instance, a splice needs reparation or drop cables need to be added at the branch point as the local communication system expands. This saves time and expense and avoids inadvertent cable damage by earth-moving equipment. An above-ground ONU is utilized for similar reasons as the pedestal but has the additional capability of converting optical modulation to electrical modulation, and vice versa, if this is necessary. Besides providing above-ground access to the distribution cable, the use of stub cables is highly desirable so that the distribution cable has as few openings in its outer protective elements as possible for minimizing the risk of environmental damage such as water ingression.

In the past, however, in those systems in which stub or drop cables are required, typically, a splice to the distribution cable must be made on site at the specified branch point. Making an onsite splice sometimes requires that the technician making the splice overcome such adverse working conditions as extreme weather and inconvenient distribution cable placement. Further, making the on-site splice is a very difficult and time-consuming procedure which entails accessing the cable at the desired branch point, carefully opening the outer sheath, radial strength yarns, buffer tubes, etc., for accessing the specified optical fibers, splicing the specified optical fibers to the stub or drop cable optical fibers, and sealing the branch point. A splice closure, normally comprised of metal, is thereafter enclosed around the branch point for providing the splices with protection from mechanical damage, and for providing an adequately strong anchoring point for the stub or drop cables.

The conventional splice closure, which must house slack buffer tubes and optical fibers without violating the minimum bend radius of the optical fibers, is relatively large so that it may provide adequate space for storage and splicing purposes. Because of its size, the conventional splice closure is impractical for all other uses except for on-site optical fiber splicing.

For example, in those systems in which the cable route architecture has been determined, preterminated cables utilizing copper conductors or the like have been designed and utilized. A preterminated cable comprises a main distribution cable and several stub and drop cables spliced to the distribution cable at various specified branch points during the initial manufacture of the cable. The stub cables, which are normally between 10 and 20 feet in length, may then be connected to a corresponding pedestal or ONU upon cable deployment. Similarly, the drop cables, which are usually less than 100 feet in length, may be connected to specified termination points upon cable installation. This facilitates the installation of cable thereby minimizing the time and cost. The stub and drop cables may also be preconnectorized, or be assembled with the appropriate connectors at the time of manufacture, for easier and faster installation.

But, in the past, preterminated optical fiber cables have not been manufactured or utilized because of the simple reason that conventional optical fiber splice closures are large and bulky thereby making them impractical for preterminated use. Because the optical fiber distribution cable may be several thousand feet in length, it is normally wound in reels upon manufacture so that it may be stored for subsequent deployment. The conventional splice closure makes a preterminated optical fiber cable quite impractical and unwieldy to be installed in this manner. In addition, an optical fiber cable utilizing conventional splice closures may not be placed on small cable reels for deployment without incurring cable or fiber damage.

Furthermore, in many applications, it is desirable that the optical fiber cable be disposed within polyvinyl chloride (PVC) piping for additional environmental and rodent protection. Because standard PVC piping has a small inner diameter, it is impossible to install a preterminated optical fiber cable utilizing the conventional splice closure. In such a situation, the only manner of providing stub or drop cable access to the distribution cable using the conventional splice closure is by making the splice after the distribution cable is deployed. Thus, providing a preterminated optical fiber cable having stub or drop cables spliced thereto while maintaining optical fiber protection and minimal overall cable size is a difficult problem which has only been recently resolved by the preterminated fiber optic cable as disclosed in a co-pending, related patent application of Nilsson et al., entitled PRETERMINATED FIBER OPTIC CABLE, filed on even date herewith.

In Nilsson et al., a preterminated fiber optic cable comprising a main distribution cable having a plurality of drop cables spliced thereto is disclosed. The unique concept of providing storage for slack optical fiber disposed outside of the corresponding buffer tubes allows the splice closure of the Nilsson et al. preterminated optical fiber cable to retain a small outer diameter (less than 4") and short overall length (less than 7") thereby allowing the preterminated cable to be deployable in most instances.

However, there are circumstances where it is desirable to use smaller PVC piping through which even the Nilsson et al. preterminated fiber optic cable will not fit. For example, if a local neighborhood with a plurality of specified termination points is to be outfitted with optical fiber cabling, a distribution cable would be routed, normally underground, in the neighborhood's vicinity. Normally, a stub cable would be spliced to the distribution cable and routed to an above-ground pedestal or ONU. There, the stub cable would be spliced to corresponding drop cables for connection with the local homes or buildings. In such an application, at initial deployment, it might be preferable to route the distribution cable through PVC piping having an inner diameter of as little as 1.25 inches so that as little excavation as possible would be required. This is especially true when existing paved streets must be excavated for cable deployment.

But, splice closures, by their very nature, must have, at the very minimum, an outer diameter of greater than two inches so that they may provide slack optical fiber storage without violating the fiber's bend radius of one inch. Therefore, in the past, the only manner of providing stub cable access to distribution cable to be deployed through 1.25 inch piping was to make a splice after the distribution cable has been deployed. As discussed above, such a method has a number of disadvantages. The technician making the splice may be faced with such adverse working conditions as extreme weather or inconvenient cable placement. Also, the buried splice is inconvenient for future access for rerouting, repair, reconfiguration, etc. Excavation for the purpose of cable access risks inadvertent cable damage.

Although highly desirable for such applications because of naturally small branch point size, spliceless preterminated cables have not been used in the past, mainly because the complex manufacturing required made the use of such cables impractical if not impossible.

As can clearly be seen, providing a spliceless preterminated optical fiber cable is a difficult problem which has not been previously resolved and even with the current level of understanding of optical fiber cables, there has not previously been a practical spliceless preterminated optical fiber cable although such a cable is desirable.

SUMMARY OF THE INVENTION

The present invention relates to a fiber optic cable having stub or drop cables extending from spliceless branch points along a main distribution cable at the time of manufacture and can easily be assembled and installed. The invention additionally relates to the method of manufacturing a preterminated optical fiber cable which has a spliceless branch point and, further, to a fiber branch module utilized therewith. Also, the invention relates to a method of modifying an existing optical fiber cable, before, during or after cable deployment, so that the cable has a spliceless branch point.

It is an object of the present invention to provide a preterminated optical fiber cable which has at least one stub or drop cable extending from a spliceless branch point which may be completely assembled at the time of manufacture and easily installed thereafter.

It is another object of the invention to provide a spliceless preterminated fiber optic cable which has at least one stub or drop cable extending therefrom, the cable being dimensioned so that it may be disposed in standard 1.25 inch PVC piping.

It is a further object of the invention to provide a method of making such a spliceless preterminated fiber optic cable.

It is yet another object of the invention to provide an optical fiber branch module which protects the optical fibers at a spliceless branch point from mechanical damage and is of minimal size.

It is still another object of the invention to provide an optical fiber branch module which allows at least one stub or drop cable to extend from a spliceless branch point, insures that the minimum bend radius of the optical fiber is not violated, insures electrical continuity of every metallic cable component, and maintains a cable outer diameter of less than 1.25 inches.

These and other objects of the invention, which will become evident upon reading the present description of the invention, are provided by a preterminated optical fiber cable constructed according to the invention having a main distribution cable and a plurality of stub or drop cables extending from various spliceless branch points along the length of the distribution cable. At each spliceless branch point, an optical fiber branch module is utilized for protecting the optical fibers from mechanical damage, providing a strong anchoring point for the optical fiber stub or drop cable, and insuring that the minimum fiber bend radius is not violated. A heat-recoverable branch point covering is applied over the branch module to provide environmental protection for the optical fibers.

The stub cables, which have typically two or more optical fibers and are usually between 10 and 12 feet in length, are utilized to route specified distribution cable optical fibers to an above-ground pedestal, ONU, or the like, for subsequent splicing with corresponding drop cables or for direct connection to an ONU for optical to electrical conversion. The drop cables, which have typically less than six optical fibers and are usually less than 100 feet in length, connect directly to the local termination points from the pedestal or ONU.

In another embodiment of the present invention, the drop cables may extend directly from a spliceless branch point in a preterminated fashion. The drop cables of this embodiment may have connectors pre-installed for easy and fast installation and are typically strapped to the distribution cable until cable deployment.

The branch module comprises a top and bottom half which are held together by screws. Extending the length of each module half is a distribution cable channel which is dimensioned for receiving a short length of the distribution cable. Extending outwardly from the center of the distribution cable channel in top half of the branch module is a stub cable opening. The stub cable opening extends outwardly at an angle so that the stub or drop cable may be received by the branch module.

In making the spliceless fiber optic cable, a small opening is made in the distribution cable at the branch point to expose the fibers that are to be branched. Another opening, termed the "disconnect point", is made in the cable several feet away from the branch point, again exposing the fibers that are to be branched. At the disconnect point, the specified fibers are cut. The disconnect point is resealed using a fabricated protective housing or a heat-recoverable water-tight closure.

At the branch point opening, the specified fibers are carefully pulled out of the length of protective buffer tubes extending between the branch point and the disconnect point so that a length of optical fiber is disposed outside of the distribution cable protective elements. The specified fibers are inserted in a stub sheath for protection. Methods of inserting the specified fibers into the stub sheath vary depending on the type of stub sheath and the length of the specified optical fibers. The stub sheath is then mechanically secured to the branch module at the branch point. A protective heat-recoverable water-tight covering is applied over the branch module for further environmental protection.

DETAILED DESCRIPTION OF THE INVENTION

Figure 1:
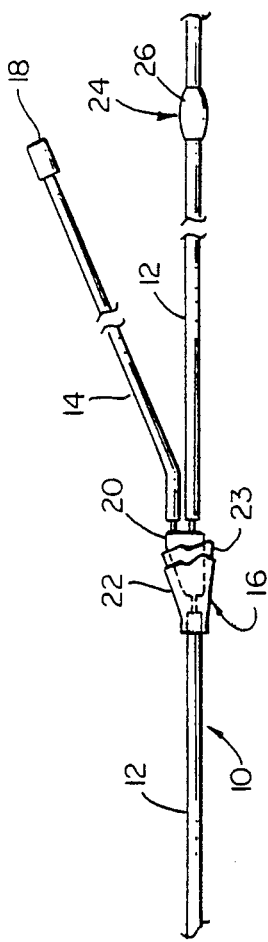
FIG. 1 is side elevational view partially cutaway showing the spliceless optical fiber cable of the present invention.

In those fiber optic communication systems in which the cable route architecture has been determined prior to the installation of the optical fiber cables, the spliceless preterminated optical fiber cable of the present invention may be designed and utilized. The spliceless preterminated optical fiber cable comprises a main distribution cable and several stub or drop cables extending from the distribution cable at various specified branch points during the initial manufacture of the cable. Referring to FIG. 1, there is shown a spliceless preterminated optical fiber cable of the present invention indicated generally by the numeral 10 having a distribution cable 12 and a smaller-sized stub cable 14 extending therefrom at branch point 16. The distribution cable, which can be several thousand feet in length, is utilized to extend between two distant termination points in the communication system. The stub cable is utilized where connections must be made from the distribution cable to a plurality of local termination points, such as local homes or buildings. Typically, upon cable deployment, the stub cable is routed from the distribution cable to an above-ground pedestal, an optical network unit (ONU), or the like. Connections are made at the pedestal from the stub cable to drop cables for direct connection to the corresponding local termination points. Alternatively, connections may be made at the ONU, after optical to electrical conversion, directly to the local homes.

The stub cable, which typically has two or more optical fibers and is usually less than 12 feet in length, can be strapped to the distribution cable with cable lashing or the like upon manufacture until deployment of the cable is required. Further, the stub cable may be "preconnectorized", or assembled with the appropriate connector at the time of manufacture, if the mating connectors of the corresponding drop cables are known. This would eliminate the need for splicing. Cable 10 of FIG. 1 has a preconnectorized stub cable 14 having connector 18 assembled to the stub cable at the time of manufacture.

Figure 2:
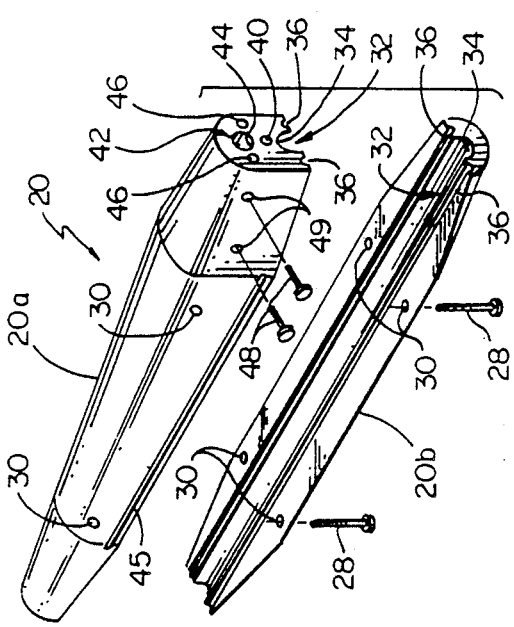
FIG. 2 is an exploded perspective view of the optical fiber branch module of the present invention.

The branch point 16 is encapsulated by an optical fiber branch module 20, the branch module being shown more clearly in FIG. 2, which protects the optical fibers at the branch point from mechanical damage. The optical fibers are further protected from moisture by a branch covering 22. The branch covering is formed of a material generally known as heat-recoverable material which is well known in the art and is formed into heat-recoverable sleeves, tubes and tapes. Disposed between the branch covering and the branch module is a non-adhesive wrap 23 so that the branch module can be re-entered easily after assembly if necessary.

When making a spliceless branch with the distribution cable, the specified optical fibers must be accessed through the protective elements of the cable, i.e., the outer sheath, metallic armored jacket, buffer tube, etc., at a disconnect point 24. To facilitate access to the fibers an optical fiber access tool, such as that illustrated in McCollum et al., U.S. Pat. No. 4,972,581, issued Nov. 27, 1990, may be used. An optical fiber access tool as described in McCollum et al. is sold by Alcatel Cable Systems, Claremont, N.C., under the designation 'Pocket Shaver'. The disconnect point can be as much as 12 feet from the branch point depending on the requirements of the stub cable. The distance between the disconnect point and the branch point is limited primarily by the tensile strength of the specified optical fibers. This will be discussed in greater detail below. The specified optical fibers are cut at the disconnect point and the distribution cable opening is repaired using a patch 26, comprised of heat-recoverable material. Alternatively, the cable may be resealed using any of a number of other common techniques well known to those skilled in the art. The selected distribution cable optical fibers are then accessed at the branch point, carefully pulled from within the cable's protective elements so that a portion of the selected optical fibers (approximately 12 feet long) is disposed outside of the cable at the branch point.

The 12-foot length of optical fibers is then inserted in a stub sheath. A stub sheath is basically an "empty" optical fiber cable, i.e., an optical fiber cable having no optical fibers or filling material disposed in the buffer tube(s). The stub sheath may be of any type of optical fiber cable, such as monotube design, depending on the particular application.

The optical fibers may be inserted into the stub sheath in one of several ways depending upon the length and type of stub sheath and the number of optical fibers to be inserted. For instance, if the fibers are to be inserted in a short stub sheath, the fibers may simply be pushed through the buffer tube opening from one end until the desired length of optical fibers is disposed in the stub sheath. Methods for inserting fibers through longer stub sheaths include pulling the fibers through the sheath using a previously inserted string or the like or using a vacuum at the opposite end of the stub sheath for sucking the optical fibers through the length of stub sheath.

After the fibers are disposed in the stub sheath, thereby forming the stub cable, a blocking compound may be inserted at each end of the stub cable around the optical fibers, using a syringe-type applicator for preventing the flow of moisture or other foreign material into the stub cable. In the alternative, filling compound may be pulled into the stub sheath with the fibers using the methods described above.

When pulling the selected optical fibers from within the distribution cable, care must be taken not to overbend the fibers. If the fibers are overbent during this process, they will be damaged. For this reason, a device having a large bend radius is gently clamped to the selected fibers and carefully pulled from within the buffer tube. Once enough fiber is removed to make a loop of adequate radius, a round device or pulling mandrel can be utilized to pull the fibers with minimum strain. Because of the stress applied to the selected fibers during removal, the tensile strength of the optical fibers is a critical factor in determining the maximum allowable distance between the branch and disconnect points. For example, if the distance between the disconnect point and the branch point is too great, the cumulative force along the length of the selected fibers exerted by the distribution cable protective elements will cause one or more of the selected fibers to break as it is being pulled from within the distribution cable. It has been found that at least 12 feet of optical fiber can be pulled from within a monotube cable of the type illustrated in the patent application of Nilsson, U.S. Ser. No. 07/468,470, filed Jan. 22, 1990, without incurring optical fiber damage. A monotube cable as described in Nilsson is sold by Alcatel Cable Systems, Claremont, N.C., under the designation 'UNITUBE TM Optical Fiber Cable.'

However, if it is desired that a longer stub or drop cable extend from the spliceless branch point, a series of openings, or access points, in the distribution cable protective elements spaced approximately 12 feet apart can be used to progressively pull the selected fibers through the corresponding 12 feet of distribution cable until the desired stub or drop cable length is obtained. For instance, if a 100-foot drop cable is desired to extend from a spliceless branch point, a disconnect point is selected 100 feet away from the selected branch point. At the disconnect point, the specified optical fibers are accessed and cut. The disconnect point is then sealed as discussed above. The selected optical fibers are then again accessed at a first access point which is positioned between the disconnect point and the branch point and spaced 12 feet from the disconnect point. The selected optical fibers are carefully pulled from within the distribution cable so that 12 feet of the selected optical fibers are disposed outside of the distribution cable at the first access point. The selected optical fibers are then again accessed 12 feet away from the first access point towards the branch point at a second access point. Again, the specified optical fibers are carefully pulled from within the distribution cable so that 24 feet of the specified optical fibers are now disposed outside of the distribution cable at the second access point. Additional access points along the distribution cable are utilized until the desired 100 feet of selected optical fibers is disposed outside of the distribution cable. Each of the access points is then sealed utilizing heat-recoverable patches. Naturally, this is an extremely delicate process due to the amount of exposed optical fiber thereby increasing the risk of breakage. Although a 100-foot spliceless drop cable is, in most cases, impractical because it is so time-consuming and risky due to the fragile nature of the glass fibers, other shorter stub or drop cables are more practical and, in fact, may be very desirable depending on the particular application.

Although the spliceless preterminated fiber optic cable is described in terms of a monotube design cable, it may be of any other type of optical fiber cable design, i.e., loose tube, tight-buffered, slotted core, etc. Thus, the spliceless preterminated optical fiber cable of the present invention can be applicable in the vast majority of optical fiber communication or information systems utilized.

FIG. 2 illustrates the optical fiber branch module of the present invention shown in an exploded perspective view. The branch module is indicated generally by the numeral 20, and is preferably comprised of a metal, such as aluminum, or a metal/plastic combination. The branch module comprises a top half 20a and a bottom half 20b which are held together by securing screws 28 (two of four shown) through securing screw holes 30 tapped through each of the module halves. When the branch module is assembled, it has a long, thin, somewhat cylindrical shape having a length of approximately five inches and a outer diameter, as its widest cross-sectional points, of approximately one inch.

Extending the length of each module half is a distribution cable channel indicated generally by the numeral 32 for receiving the short length of the monotube-design distribution cable where the branch is to be made. The distribution cable channel comprises a semi-cylindrically shaped monotube channel 34 dimensioned to receive a length of the monotube of the distribution cable, and two semi-cylindrically shaped strength member channels 36 extending longitudinally along either side of the monotube channel. The strength member channels are dimensioned to receive the longitudinally extending strength members of the distribution cable. Each monotube channel is dimensioned so that when the monotube is disposed in the branch module, the monotube channel of each half exerts little to no compressive force on the monotube. The strength member channels, on the other hand, are dimensioned so that when the branch module is properly assembled, the strength member channels of each half exert considerable compressive force on the strength members of the distribution cable thereby securing the branch module at the branch point.

As discussed above, the branch module 20, as shown in FIG. 2, is illustrative of a branch module which can be used with a monotube design optical fiber cable. The branch module can be easily modified in design so that it may be used with other types of optical fiber cable designs, i.e., loose tube, tight-buffered, slotted core, etc. For example, a modification of the distribution cable channel 32 so that it is dimensioned for receiving the buffer tube(s) and strength member(s) of the corresponding type of optical fiber cable would allow the module to be adaptable as described.

Each end of the top module half 20a has a ground strap set screw hole 40 for securing ground straps to the module. The ground straps are connected, at their other ends, to the corresponding armored jackets of the distribution cable and the stub or drop cables thereby maintaining continuity of the cable conductive elements.

Alternatively, the armored jackets of the respective cables may be connected via ground straps directly, bypassing the module if, for instance, the module is comprised of plastic. To minimize the overall outer diameter of the branch point, the ground straps can be disposed in groove 45 disposed along the side of the module.

One end 41 of the top half 20a further has a stub cable entrance channel indicated generally by the numeral 42. The stub cable entrance channel extends into the branch module from end 41 so that it intersects the distribution cable channel of the top half 20a. This allows the branch module to receive the stub cable. The junction of the stub cable entrance channel and the distribution cable channel is located substantially in the center of the branch module. The stub cable entrance channel comprises a cylindrically-shaped monotube channel 44 and two cylindrically-shaped strength member channels 46 disposed longitudinally on either side of the stub cable monotube channel 44. The stub cable monotube channel 44 is dimensioned for receiving a buffer tube of a stub cable of monotube design. Again, similar to the distribution cable, the stub cable may be of any other type of optical fiber cable design with simple design modifications to the branch module.

The stub cable monotube channel 44 is dimensioned so that, during assembly, the stub cable monotube may be easily slid into the branch module. Similarly, the strength member channels are dimensioned so that stub cable strength members may be easily slid into the branch module. Set screws 48 are utilized with set screw holes 49 tapped into top half 20a to secure the strength members of the stub cable to the module.

Figure 3:
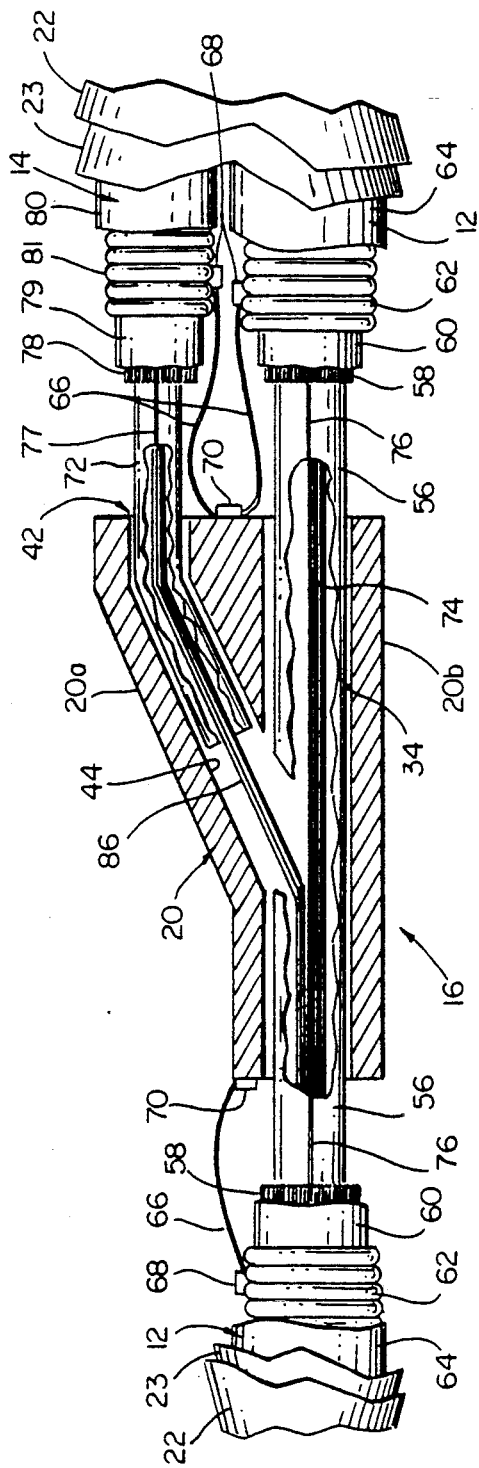
FIG. 3 is a partial cross-sectional view of the spliceless fiber optic cable at the branch point.

At FIG. 3 of the drawings, therein is illustrated an enlarged view of branch point 16, shown in partial cross-section. In this view, the distribution and stub cable monotubes 56, 72, respectively, and cable strength members 76, 77, respectively, are partially cut away so that the optical fibers 74, 86 of the distribution cable and stub cable are illustrated.

In the assembled condition, the top module half 20a juxtaposes the bottom module half 20b and secured in position by securing screws (two of four shown as element 28 in FIG. 2). Further, in the fully assembled condition, the non-adhesive wrap 23 and the heat-recoverable covering 22 would completely encapsulate the branch point.

As can be seen, the monotube-design distribution cable 12 comprises a monotube 56 which encapsulates a plurality of optical fibers 74 extending the length of the cable. The number of optical fibers disposed in the monotube may vary depending upon the requirements of the particular cable. Two strength members 76 (one shown partially cut away) are disposed longitudinally on the sides of the monotube of the distribution cable. It should be noted that while the monotube 56 and strength member 76 are shown cut away to a great extent, only a small portion of monotube 56 is removed at the junction of the distribution monotube channel 34 and the branch monotube channel 44. The strength members 76 extend entirely through the module. Reverse helically applied radial strength yarns 58 are disposed about the monotube for additional cable strength while retaining flexibility. The radial strength yarns are preferably of a material such as aramid. An inner jacket 60 may then be extruded about the radial strength yarns. Disposed about the inner jacket is an armored jacket 62 for rodent protection. Finally, an outer sheath 64 is extruded to provide an environmental protective layer and to provide a visually attractive cable.

When used with the branch module 20, the outer sheath, armored jacket, radial strength yarns, and inner jacket must be removed so that only the monotube and the strength members are disposed within the branch module. These distribution cable components are only removed to the extent necessary for exposing a sufficient length of monotube and strength members to be enclosed within the branch module.

The monotube-design stub cable 14, comprises a monotube 72 which encapsulates one or more optical fibers 86. The number of optical fibers disposed in the stub cable monotube, although typically greater than six, may vary depending upon the requirements of the particular stub cable. Reverse helically applied radial strength yarns 78 are disposed about the monotube for additional stub cable strength while retaining flexibility. The radial strength yarns are preferably of a material such as aramid. Extending longitudinally with and disposed on either side of the monotube are strength members 77 (one shown partially cut away). An inner jacket 79 may then be extruded about the strength members and the strength yarns. Disposed about the inner jacket is an armored jacket 81 for rodent protection. Finally, an outer sheath 80 is extruded to provide an environmental protective layer and to provide a visually attractive cable.

Similar to the distribution cable components, the outer sheath, armored jacket, inner jacket, and radial strength yarns of the stub cable must be removed so that the monotube and strength members are exposed prior to assembly.

To assemble, the exposed lengths of distribution cable monotube and strength members are configured so that they are disposed in the monotube channel and the strength member channels, respectively, of bottom half 20b. The disposed length of selected optical fibers 86, which had been previously removed from the distribution cable protective elements, is carefully inserted through the stub cable monotube channel 44 so that most of the length extends outside of the branch module 20. The two module halves are secured together by securing screws (elements 28 in FIG. 2) so that the distribution cable strength members are clamped between the two module halves 20a, 20b in their respective strength member channels 36.

The disposed length of selected optical fibers must then be carefully inserted in the empty stub cable using one of the methods described above. The ends of the stub cable may then be filled with a blocking compound using a syringe-type applicator. Alternatively, filling compound may be pulled into the empty stub monotube with the fibers using well known methods.

The stub cable monotube and strength members are then inserted into the stub cable entrance channel 42. Securing screws (two shown as elements 48 in FIG. 2) are used to secure the stub cable strength members to the branch module. Grounding straps 66 are connected, at one end, to the respective armored jackets 62, 81 of the distribution and stub cables with clamps 68 and, at the other end, to the branch module with set screws 70 to the ground strap set screw holes. A non-adhesive wrap 23 is applied, completely enclosing the branch point, and a heat-recoverable water-tight wrap 22 is applied thereafter. The heat-coverable and non-adhesive wraps combine to make the branch point substantially water-tight but re-enterable if required. If the branch module is comprised of plastic; the non-adhesive wrap is not necessary.

Although FIG. 3 shows a monotube optical fiber cable disposed in the module, other types of optical fiber cables may be utilized with the module as well, with slight variations. For instance, a slotted core optical fiber, by definition, does not comprise buffer tubes encompassing the fibers. The slotted core optical fiber, cable rather, has a slotted core central strength member with helical or contrahelical grooves extending therealong for receiving one or more optical fibers. Therefore, to be utilized with the module, the cable would need to be stripped of its protective elements only to the extent that a portion of the slotted core central strength member with the fibers disposed in the corresponding slotted core grooves, is disposed within the module.

Thus, the spliceless preterminated optical fiber cable of the present invention provides an optical fiber cable having a spliceless branch point with at least one stub or drop cable extending therefrom while retaining an outer diameter small enough so that the cable may be deployed through standard 1.25 inch PVC piping. Further, because of its small size, the branch module of the present invention may be utilized during the initial manufacture of the optical fiber cable as the cable may be placed on small cable reels for storage until deployment without incurring cable or fiber damage. The branch module provides the branch point with protection from mechanical damage while insuring that the minimum bend radius of the optical fibers is not violated. In addition, the branch module insures electrical continuity of every metallic cable component. It provides an adequately strong anchoring point for the optical fiber stub or drop cable and is re-enterable for future fiber branching.

While the present invention has been described with respect to a particular manner of implementing the invention, it is to be understood that the foregoing description is intended to inform and not to limit. The invention resides in the innovations described herein and in all present and future manners of implementing these innovations. The following claims are to be understood to encompass all manner of practicing the invention which are or which become evident in view of the relevant technology as it exists now and as it develops.

What is claimed is:

1. A fiber optic cable assembly, comprising:
a distribution cable having a predetermined length and having first and second ends, said distribution cable further having a branch point being positioned along the length thereof, said distribution cable including; optical fiber buffering means having a length substantially equal to said predetermined length and having first and second ends, at least one optical fiber of substantially said predetermined length disposed within and enclosed by said buffering means, said fiber having first and second ends substantially coincident with the first and second ends of said distribution cable, and at least one branching optical fiber having first and second ends and having a first portion extending between its first end being coincident with said distribution cable first end and said branch point, said first portion being disposed within and enclosed by said buffering means and having a second portion extending between said branch point and its second end, said second portion being disposed outside of said buffering means and being continuous with said first portion; and
at least one branch cable having buffering means for encompassing said second portion of said branching optical fiber.

2. A fiber optic cable assembly as described in claim 1, wherein said fiber optic cable assembly further comprises means secured to said distribution cable and to said branch cable for encompassing said branch point.

3. A fiber optic cable assembly as described in claim 2, wherein said branch point encompassing means includes a branch module having a branch module body having means for receiving a length of said distribution cable extending therethrough and means for receiving said branch cable.

4. A fiber optic cable assembly as described in claim 3, wherein said branch module further has means for securing a strength member of said branch cable to said branch module body.

5. A fiber optic cable assembly as described in claim 3, wherein said branch module further has means for securing a strength member of said distribution cable to said branch module body.

6. A fiber optic cable assembly as described in claim 3, wherein said branch point encompassing means further includes conductive means for connecting an armored jacket of said distribution cable to said branch module body and for connecting an armored jacket of said branch cable to said branch module body.

7. A fiber optic cable assembly as described in claim 3, wherein said branch module has first and second ends, said distribution cable receiving means being disposed at said branch module first and second ends, whereby said length of distribution cable extends between said branch module first and second ends.

8. A fiber optic cable assembly as described in claim 7, wherein said branch module has a maximum outer diameter of less than 1.25 inches.

9. A fiber optic cable assembly as described in claim 7, wherein said branch module length is less than five inches.

10. A fiber optic cable assembly as described in claim 3, wherein said branch point encompassing means further includes means for covering said branch module.

11. A fiber optic cable assembly as described in claim 11, wherein said covering means comprises a heat-recoverable wrap.

12. A fiber optic cable assembly as described in claim 11, wherein said covering means further comprises a non-adhesive wrap disposed between said branch module and said heat-recoverable wrap.

13. A fiber optic cable assembly as described in claim 1, wherein said second portion of said branching optical fiber has a specified length no greater than 12 feet.

14. A fiber optic cable assembly as described in claim 13, wherein said distribution cable further includes a disconnect point positioned along the length of said distribution cable, said disconnect point being positioned at said specified length no greater than 12 feet from said branch point.

15. A fiber optic cable assembly as described in claim 14, wherein said disconnect point is encompassed by heat-recoverable wrap.

16. A fiber optic cable assembly as described in claim 1, wherein said second portion of said branching optical fiber has a specified length greater than 12 feet and further wherein said distribution cable further includes a disconnect point is positioned said specified length greater than 12 feet away from said branch point along the length of said distribution cable.

17. A fiber optic cable assembly as described in claim 16, wherein said distribution cable further includes at least one access point positioned between said branch point and said disconnect point along the length of said distribution cable.

18. A fiber optic cable assembly as described in claim 2, wherein said distribution cable buffering means includes a monotube encompassing said optical fibers and further wherein said distribution cable further includes at least one strength member extending longitudinally with said monotube.

19. A fiber optic cable assembly as described in claim 18, wherein said branch point encompassing means includes means for securing said at least one strength member to said branch point encompassing means.

20. A fiber optic cable assembly as described in claim 2, wherein said branch cable buffering means includes a monotube encompassing said second portion of said branching optical fiber and further wherein said branch cable further has at least one strength member extending longitudinally with said branch cable monotube.

21. A fiber optic cable assembly as described in claim 20, wherein said branch point encompassing means further includes means for securing said at least one strength member of said branch cable to said branch point encompassing means.

22. A method of making a fiber optic cable assembly utilizing a distribution cable having a predetermined length and having first and second ends, said distribution cable further having a branch point and a disconnect point each being positioned along the length of said distribution cable, said distribution cable including; optical fiber buffering means of said predetermined length, at least one optical fiber of said predetermined length disposed within and enclosed by said buffering means, said optical fiber having first and second ends coincident with said first and second ends of said distribution cable, and at least one branching optical fiber having first and second ends and having a first portion extending between the branching optical fiber first end being coincident with said distribution cable first end and said branch point and having a second portion extending between said branch point and the branching optical fiber second end being coincident with said disconnect point, said branching optical fiber being disposed within and enclosed by said distribution cable buffering means, and at least one branch cable having buffering means, said method comprising the steps of:
removing a portion of said distribution cable buffering means at said branch point so that said branching optical fiber is accessible;
removing said branching optical fiber second portion from within said distribution cable buffering means so that said branching optical fiber second portion is disposed outside of said distribution cable buffering means; and
configuring said branch cable buffering means so that it encompasses said branching optical fiber second portion.

23. A method of making a fiber optic cable assembly as described in claim 22, wherein said method further comprises the step of enclosing said branch point with a branch module.

24. A method of making a fiber optic cable assembly as described in claim 23, wherein said method further comprises the step of encapsulating said branch module with a heat-recoverable wrap.

25. A method of making a fiber optic cable assembly as described in claim 23, wherein said method further comprises the steps of encapsulating the branch module with a non-adhesive wrap and encapsulating said non-adhesive wrap with a heat-recoverable wrap.

26. A method of making a fiber optic cable assembly as described in claim 22, wherein said fiber optic cable assembly includes a plurality of branch cables and said method further comprises the step of strapping said plurality of branch cables to said distribution cable.

27. A method of making a fiber optic cable assembly as described in claim 23, wherein said distribution cable buffering means includes at least one buffer tube and said distribution cable further includes an outer jacket encapsulating said buffer tube and further wherein said method further comprises, before said distribution cable buffering means removing step, the step of removing the portion of said outer jacket at said branch point.

28. A method of making a fiber optic cable assembly as described in claim 27, wherein said distribution cable further comprises an armored jacket disposed between said outer jacket and said buffer tube and further wherein said method further comprises, after said outer jacket removing step, the step of removing the portion of said armored jacket at said branch point.

29. A method of making a fiber optic cable assembly as described in claim 28, wherein said distribution cable further includes an inner jacket disposed between said armored jacket and said buffer tube and further wherein said method further comprises, after said armored jacket removing step, the step of removing said inner jacket at said branch point.

30. A method of making a fiber optic cable assembly as described in claim 29, wherein said distribution cable further includes radial strength yarns disposed between said inner jacket and said buffer tube and further wherein said method further comprises, after said inner jacket removing step, the step of removing said radial strength yarns at said branch point.

31. A method of making a fiber optic cable assembly as described in claim 28, wherein said method further comprises the step of connecting a grounding strap between said armored jacket and said branch module.

32. A method of making a fiber optic cable assembly as described in claim 23, wherein said branch cable further comprises at least one strength member and said method further comprises the step of securing said at least one strength member to said branch module.

33. A method of making a fiber optic cable assembly utilizing a distribution cable having a predetermined length and having first and second ends, said distribution cable further having a branch point and a disconnect point each being positioned along the length of said distribution cable, said distribution cable including; optical fiber buffering means of said predetermined length, a plurality of optical fibers of said predetermined length disposed within and enclosed by buffering means, said optical fibers having first and second ends coincident with the first and second ends of said distribution cable, and at least one branch cable having buffering means, said method comprising the steps of:
removing a portion of said distribution cable buffering means at said disconnect point so that said plurality of optical fibers are accessible;
cutting at least one of said plurality of optical fibers at said disconnect point;
removing a portion of said distribution cable buffering means at said branch point so that said at least one optical fiber is accessible;
moving from within said distribution cable buffering means the length of said at least one optical fiber extending between said branch point and said disconnect point so that said length of said at least one optical fiber is disposed outside of said distribution cable buffering means; and configuring said branch cable buffering means so that it encompasses said length of said at least one optical fiber.

34. A method for making a fiber optic cable assembly as described in claim 33, wherein said fiber optic cable assembly further has a branch module and said method further comprises the step of enclosing said branch point with said branch module.

35. A method of making a fiber optic cable assembly as described in claim 34, wherein said method further comprises the step of encapsulating said branch module with a heat-recoverable wrap.

36. A method of making a fiber optic cable assembly as described in claim 33, wherein said method further comprises the step of encapsulating said disconnect point with heat-recoverable patch.

37. A method of making fiber optic cable assembly as described in claim 33, wherein said branch cable buffering means configuring step comprises inserting an end of said length of said at least one optical fiber into an end of said branch cable buffering means and moving said length of said at least one optical fiber into said branch cable buffering means until said length of said at least one optical fiber is substantially completely encompassed by said branch cable buffering means.

38. A method of making a fiber optic cable assembly as described in claim 33, wherein said at least one branch cable further has a string having a length greater than the length of said branch cable buffering means, said string being encompassed by said branch cable buffering means, and further wherein said branch cable buffering means configuring step comprises attaching one end of said string to an end of said length of said at least one optical fiber and pulling said string at its other end so that said branch cable buffering means substantially completely encompasses said length of said at least one optical fiber and said string is disposed outside of said branch cable buffering means.

39. A method of making a fiber optic cable assembly as described in claim 33, wherein said disconnect point is positioned at a specified length greater than 12 feet from said branch point along the length of said distribution cable, said distribution cable further having at least one access point positioned between said branch point and said disconnect point, said method further comprises, before said moving step, the steps of removing a portion of said distribution cable buffering means at said access point so that said at least one optical fiber is accessible, and moving from within said distribution cable buffering means the length of said at least one optical fiber extending between said access point and said disconnect point so that said length of said at least one optical fiber is disposed outside of said distribution cable buffering means.

40. A method of making a fiber optic cable assembly as described in claim 39, wherein said method further comprises the step of encapsulating said access point with a heat-recoverable patch.

41. A fiber optic cable assembly, comprising:
a slotted core distribution cable having a predetermined length and having first and second ends, said distribution cable further having a branch point being positioned along the length thereof, said distribution cable including; a longitudinally extending slotted core central strength member having at least one groove therealong and having a length substantially equal to said predetermined length and having first and second ends, at least one optical fiber of substantially said predetermined length disposed within said groove, said fiber having first and second ends substantially coincident with the first and second ends of said distribution cable, and at least one branching optical fiber having first and second ends and having a first portion extending between its first end being coincident with said distribution cable first end and said branch point, said first portion being disposed within said groove and having a second portion extending between said branch point and its second end, said second portion being disposed outside of said groove and being continuous with said first portion; and at least one branch cable having buffering means for encompassing said second portion of said branching optical fiber.

42. A method of making a fiber optic cable assembly utilizing a slotted core distribution cable having a predetermined length and having first and second ends, said distribution cable further having a branch point and a disconnect point each being positioned along the length of said distribution cable, said distribution cable including; a longitudinally extending slotted core central strength member of said predetermined length having at least one groove therealong, at least one optical fiber of said predetermined length disposed within said groove, said optical fiber having first and second ends coincident with said first and second ends of said distribution cable, at least one branching optical fiber having first and second ends and having a first portion extending between the branching optical fiber first end being coincident with said distribution cable first end and said branch point and having a second portion extending between said branch point and the branching optical fiber second end being coincident with said disconnect point, said branching optical fiber being disposed within said groove, and outer jacketing means for encompassing said optical fibers and said central strength member, said method further utilizing at least one branch cable having buffering means, said method comprising steps of:

removing a portion of said outer jacketing means at said branch point so that said branching optical fiber is accessible;

removing said branching optical fiber second portion from within said outer jacketing means so that said branching optical fiber second portion is disposed outside of said outer jacketing means; and configuring said branch cable buffering means so that it encompasses said branching optical fiber second portion.

43. A fiber optic cable assembly, comprising:
a distribution cable having a predetermined length, first and second ends and a branch point positioned along the length thereof, said distribution cable including, optical fiber guiding means having first and second ends, defining a length substantially equal to said predetermined length, at least one optical fiber of substantially said predetermined length disposed within said guiding means, said fiber having first and second ends of said distribution cable, and at least one branching optical fiber having first and second ends and having a first portion extending between its first end being coincident with said distribution cable first end and said branch point, said first portion being disposed within said guiding means and having a second portion extending between said branch point and its second end, said second portion being disposed outside of said guiding means and being continuous with said first portion; and at least one branch cable having buffering means for encompassing said second portion of said branching optical fiber.

* * * * *

UNITED STATES PATENT AND TRADEMARK OFFICE
CERTIFICATE OF CORRECTION

PATENT NO. : 5,125,060

DATED : June 23, 1992

INVENTOR(S) : Gary W. Edmundson

It is certified that error appears in the above-identified patent and that said Letters Patent is hereby corrected as shown below:

Column 16, line 66, claim 43, after "fiber having first and second ends", add --substantially coincident with the first and second ends--.

Signed and Sealed this

Seventeenth Day of August, 1993

Attest:

BRUCE LEHMAN

Attesting Officer

Commissioner of Patents and Trademarks